(12) United States Patent
Morris

(10) Patent No.: US 10,591,906 B2
(45) Date of Patent: Mar. 17, 2020

(54) MANUFACTURING ENVIRONMENT MANAGEMENT SYSTEM

(71) Applicant: Morris Controls, Inc., Newington, CT (US)

(72) Inventor: Scott Morris, Farmington, CT (US)

(73) Assignee: MORRIS CONTROLS, INC., Newington, CT (US)

( * ) Notice: Subject to any disclaimer, the term of this patent is extended or adjusted under 35 U.S.C. 154(b) by 87 days.

(21) Appl. No.: 15/920,543

(22) Filed: Mar. 14, 2018

(65) Prior Publication Data

US 2019/0286112 A1      Sep. 19, 2019

(51) Int. Cl.
*G05B 19/418* (2006.01)

(52) U.S. Cl.
CPC .......... *G05B 19/41865* (2013.01); *G05B 2219/31304* (2013.01); *G05B 2219/31344* (2013.01); *G05B 2219/31406* (2013.01); *G05B 2219/32086* (2013.01); *G05B 2219/32128* (2013.01)

(58) Field of Classification Search
CPC .... G05B 19/41865; G05B 2219/31344; G05B 2219/31304; G05B 2219/31406; G05B 2219/32128; G05B 2219/32086
See application file for complete search history.

(56) References Cited

U.S. PATENT DOCUMENTS

| | | | |
|---|---|---|---|
| 5,088,045 A * | 2/1992 | Shimanaka | G05B 19/41835 700/110 |
| 5,933,813 A | 8/1999 | Teicher et al. | |
| 6,082,620 A | 7/2000 | Bone, Jr. | |
| 6,105,004 A | 8/2000 | Halperin et al. | |
| 6,430,605 B2 | 8/2002 | Hunter | |
| 6,600,476 B2 * | 7/2003 | Mathis | G05B 19/41805 345/156 |
| 6,601,764 B1 | 8/2003 | Goodwin, III | |
| 6,717,522 B1 | 4/2004 | Nagatomo et al. | |
| 6,753,830 B2 | 6/2004 | Gelbman | |

(Continued)

FOREIGN PATENT DOCUMENTS

| | | |
|---|---|---|
| EP | 2 750 095 A1 | 7/2014 |
| GB | 2503961 A | 1/2014 |

(Continued)

*Primary Examiner* — Christopher E. Everett

(74) *Attorney, Agent, or Firm* — Cantor Colburn LLP

(57) ABSTRACT

A system includes wireless access points operable to communicate with a communication network and electronic tracking devices that each include an electronic-ink display. The electronic tracking devices are operable to communicate wirelessly with the wireless access points. The system also includes manufacturing system operator computer systems operable to communicate with the communication network. The system further includes a server operable to execute instructions to update at least one entry in a manufacturing system database based on receiving an operation notification from one of the manufacturing system operator computer systems. The server can transmit a display update for the electronic-ink display of an identified electronic tracking device through at least one of the wireless access points based on determining that the operation notification includes a transition from a current manufacturing process step to a next manufacturing process step.

20 Claims, 12 Drawing Sheets

(56) References Cited

U.S. PATENT DOCUMENTS

| | | |
|---|---|---|
| 6,844,821 B2 | 1/2005 | Swartzel et al. |
| 6,897,763 B2 | 5/2005 | Schulmerich et al. |
| 6,959,862 B2 | 11/2005 | Neumark |
| 7,119,759 B2 | 10/2006 | Zehner et al. |
| 7,152,040 B1 | 12/2006 | Hawthorne et al. |
| 7,413,121 B2 | 8/2008 | Goel et al. |
| 7,584,888 B2 | 9/2009 | Stephenson et al. |
| 7,658,327 B2 | 2/2010 | Tuchman et al. |
| 8,261,971 B2 | 9/2012 | Hung et al. |
| 8,403,215 B2 | 3/2013 | Aihara et al. |
| 8,463,647 B2 | 6/2013 | Sugimoto |
| 8,556,172 B2 | 10/2013 | Nakamura |
| 8,698,606 B2 | 4/2014 | Choi et al. |
| 8,800,869 B2 | 8/2014 | Waters |
| 9,275,361 B2 | 3/2016 | Meyer |
| 9,536,403 B2 | 1/2017 | Kim et al. |
| 9,589,218 B2 | 3/2017 | Ciavatta |
| 9,697,405 B2 | 7/2017 | Bremer |
| 9,778,538 B2 | 10/2017 | Telfer et al. |
| 9,824,624 B2 | 11/2017 | Howard et al. |
| 9,829,764 B2 | 11/2017 | Paolini, Jr. et al. |
| 2002/0042722 A1 | 4/2002 | Tsuji et al. |
| 2003/0102367 A1* | 6/2003 | Monette ............ G05B 19/4183 235/376 |
| 2004/0217877 A1 | 11/2004 | Kokonaski et al. |
| 2007/0045421 A1 | 3/2007 | Liu |
| 2007/0188483 A1 | 8/2007 | Bonner |
| 2008/0095443 A1 | 4/2008 | Gilfix |
| 2008/0121168 A1* | 5/2008 | Ryznar ............ G05B 19/41805 116/201 |
| 2008/0198098 A1 | 8/2008 | Gelbman et al. |
| 2008/0268934 A1 | 10/2008 | Mattice et al. |
| 2010/0001924 A1 | 1/2010 | Nobutsugu et al. |
| 2010/0078482 A1 | 4/2010 | Bradford |
| 2010/0118200 A1 | 5/2010 | Gelman et al. |
| 2010/0177080 A1 | 7/2010 | Essinger et al. |
| 2010/0187305 A1 | 7/2010 | Holcomb |
| 2011/0148750 A1 | 6/2011 | Ayala |
| 2011/0178627 A1* | 7/2011 | Wechter ........... G05B 19/41875 700/109 |
| 2011/0288915 A1 | 11/2011 | Mochizuki |
| 2011/0289023 A1 | 11/2011 | Forster et al. |
| 2014/0200976 A1 | 7/2014 | Smith et al. |
| 2014/0316901 A1 | 10/2014 | Grabovski et al. |
| 2014/0372254 A1 | 12/2014 | Aragane et al. |
| 2015/0035674 A1 | 2/2015 | Karhuketo |
| 2015/0210199 A1 | 7/2015 | Payne |
| 2015/0227827 A1 | 8/2015 | Sakurai |
| 2015/0324745 A1 | 11/2015 | Goodall et al. |
| 2015/0379549 A1 | 12/2015 | Hwang |
| 2016/0055561 A1 | 2/2016 | Kim |
| 2016/0134930 A1 | 5/2016 | Swafford |
| 2016/0328767 A1 | 11/2016 | Bonner et al. |
| 2017/0337407 A1 | 11/2017 | Chang et al. |

FOREIGN PATENT DOCUMENTS

| | | |
|---|---|---|
| GB | 2520307 A | 5/2015 |
| JP | 2008-298902 A | 12/2008 |
| WO | 2006/012939 A1 | 2/2006 |
| WO | 2006/012997 A2 | 2/2006 |
| WO | 2006/012998 A1 | 2/2006 |
| WO | 2006/115630 A1 | 11/2006 |
| WO | 2010/082835 A1 | 7/2010 |
| WO | 2012/114142 A1 | 8/2012 |
| WO | 2013/118088 A1 | 8/2013 |
| WO | 2013/132273 A2 | 9/2013 |
| WO | 2013/137787 A1 | 9/2013 |
| WO | 2014/007737 A1 | 1/2014 |
| WO | 2014/209119 A2 | 12/2014 |
| WO | 2015/136146 A1 | 9/2015 |
| WO | 2017/048176 A1 | 3/2017 |
| WO | 2017/055119 A1 | 4/2017 |
| WO | 2017/093981 A1 | 6/2017 |
| WO | 2017/119872 A1 | 7/2017 |

* cited by examiner

Create New Job

Tag ID: 53-55-0C-0C — 710

Part Number: PCDMX04-002 ---- 14" Steel Barstock — 712

Job Number: 20180207 — 714

Quantity: 1000 — 716

Due Date: 02/25/2018 — 718

[Back] [Create] ← 720

ALL WAPS: ONLINE — 704

Write pending... — 706

Job Number: 20180207
Last Operator: Admin
Part Number: CDMX04-002
Quantity: 0/1000
Material: Steel ORDERMATL
Order steel barstock Last Step Date: 2018-02-07 9:56:28
02/25/2018

Split Off Multiple Tags

Scan New Tag: 53-56-EC-0C — 1010
Scan Operator: Morris — 1012
Enter New Quantity: 500 — 1014

Enter Notes: Split off 500 parts to Morris — 1016

[Back] [Submit] — 1020

ALL WAPS: ONLINE — 1004
Next Process Step: INSPECTION — 1005
Write pending... — 1006

Job Number: 20180207
Last Operator: Morris
Part Number: CDMX04-002
Quantity: 500/1000
Material: Steel INSPECTION
Inspect finished parts Last Step Date: 2018-02-07 10:03:59
02/25/2018

All Active Jobs

[Back]

| esl | lastStep | currentStep | currentStepType | currentStepNum | operator | jobNumber | specQty |
|---|---|---|---|---|---|---|---|
| 53-56-CA-0C | | ORDERMATL | SUPERVISORY | 1 | Admin | 20171006_04 | 1000 |
| 53-56-D7-0C | ORDERMATL | Bandsaw | CUTTING | 2 | Bombard | 20171006_03 | 1000 |
| 53-55-0C-0C | PROTOTRAK LATHE | INSPECTION | Supervisory | 4 | Bombard | 20171006_02 | 1000 |
| 53-56-EC-0C | BANDSAW | CNCLATHE | LATHE | 3 | Quick | 20171006_01 | 1000 |
| 57-CF-58-99 | ORDERMATL | BANDSAW | CUTTING | 2 | Weiss | 20171004 | 1000 |

| actualQty | material | warning | partnumber | startdate | lastStepDate |
|---|---|---|---|---|---|
| 0 | Aluminum | Due Date: 10/31/2017 | CDMX04-001 | 10/6/2017 9:53:45 AM | |
| 0 | Steel | Due Date: 10/31/2017 | CDMX04-002 | 10/6/2017 9:50:38 AM | 10/6/2017 10:04:28 AM |
| 0 | Steel | Due Date: 10/31/2017 | CDMX04-002 | 10/6/2017 9:46:20 AM | 10/6/2017 10:07:07 AM |
| 0 | Aluminum | Due Date: 10/31/2017 | CDMX04-001 | 10/6/2017 9:43:18 AM | 10/6/2017 10:08:37 AM |
| 1000 | Aluminum | Due Date: 10/15/2017 | CDMX04-001 | 10/4/2017 8:54:10 AM | 10/4/2017 10:24:09 AM |

FIG. 11

MANUFACTURING ENVIRONMENT MANAGEMENT SYSTEM

BACKGROUND

In a manufacturing environment there are typically multiple processing steps to process materials, perform various machining operations, inspections, and cleaning steps to produce a manufactured product. In order to understand which steps have been completed and if any issues have been identified, a collection of papers typically travels with parts through the processing steps. Paper-based tracking can be effective for relatively simple manufacturing tasks; however, paper-based tracking may increase the risk of incomplete tracking such that the status of parts in progress is not readily known, particularly from a remote location. Paper-based tracking can also slow down manufacturing process step transitions, as notes are written and subsequent processing steps are determined.

SUMMARY

According to some embodiments, a system is provided for a manufacturing environment. The system includes one or more wireless access points operable to communicate with a communication network and one or more electronic tracking devices each including an electronic-ink display. The one or more electronic tracking devices are operable to communicate wirelessly with the one or more wireless access points. The system also includes a plurality of manufacturing system operator computer systems operable to communicate with the communication network. Each of the manufacturing system operator computer systems can be associated with at least one manufacturing work area. The system further includes a server operable to communicate with the communication network. The server includes a processing system and a memory system in communication with the processing system. The memory system includes a manufacturing system database and a plurality of instructions that when executed by the processing system result in updating at least one entry in the manufacturing system database based on receiving an operation notification from one of the manufacturing system operator computer systems. The server is operable to determine a current manufacturing process step associated with the operation notification and identify an electronic tracking device of the one or more electronic tracking devices associated with the operation notification. The server can transmit a display update for the electronic-ink display of the identified electronic tracking device through at least one of the one or more wireless access points based on determining that the operation notification includes a transition from the current manufacturing process step to a next manufacturing process step.

According to embodiments, a method includes updating, by a server, at least one entry in a manufacturing system database based on receiving an operation notification from one of a plurality of manufacturing system operator computer systems. The server determines a current manufacturing process step associated with the operation notification and identifies an electronic tracking device associated with the operation notification. A display update for an electronic-ink display of the identified electronic tracking device is transmitted through at least one wireless access point based on determining that the operation notification includes a transition from the current manufacturing process step to a next manufacturing process step.

According to embodiments a computer program product includes a storage medium embodied with computer program instructions that when executed by a processing system of a server cause the server to implement updating at least one entry in a manufacturing system database based on receiving an operation notification from one of a plurality of manufacturing system operator computer systems. The computer program instructions further cause the server to determine a current manufacturing process step associated with the operation notification and identify a current manufacturing process step associated with the operation notification. The computer program instructions further cause the server to transmit a display update for an electronic-ink display of the identified electronic tracking device through at least one wireless access point based on determining that the operation notification includes a transition from the current manufacturing process step to a next manufacturing process step.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

FIG. 7 depicts an interactive user interface to create a new job according to some embodiments of the present invention;

FIG. 10 depicts an interactive user interface for process splitting according to some embodiments of the present invention;

FIG. 11 depicts an active job report according to some embodiments of the present invention.

DETAILED DESCRIPTION

According to an embodiment, a system for manufacturing environment management is provided. The system enhances manufacturing processes through part tracking, process step transition enforcement, process time monitoring, and manufacturing process planning. Rather than using paper-based tracking of parts to record process step actions, electronic tracking devices are provided that each include an electronic-ink display and a wireless communication interface. One or more identifiers on the electronic tracking devices can be observed or scanned at manufacturing system operator computer systems to assist in tracking movement of parts, processing step completion history, processing notes, and processing time for a plurality of parts as the parts transition through multiple work areas in a manufacturing environment. The electronic-ink displays of the electronic tracking devices have a lower power consumption than touchscreens or other electronic displays and may operate on battery power for multiple years (e.g., five or more years) without needing to be replaced or recharged. The electronic tracking devices can be configured as receive-and-display devices absent interactive user inputs to support reduced wireless network traffic and power requirements.

Figure 1:
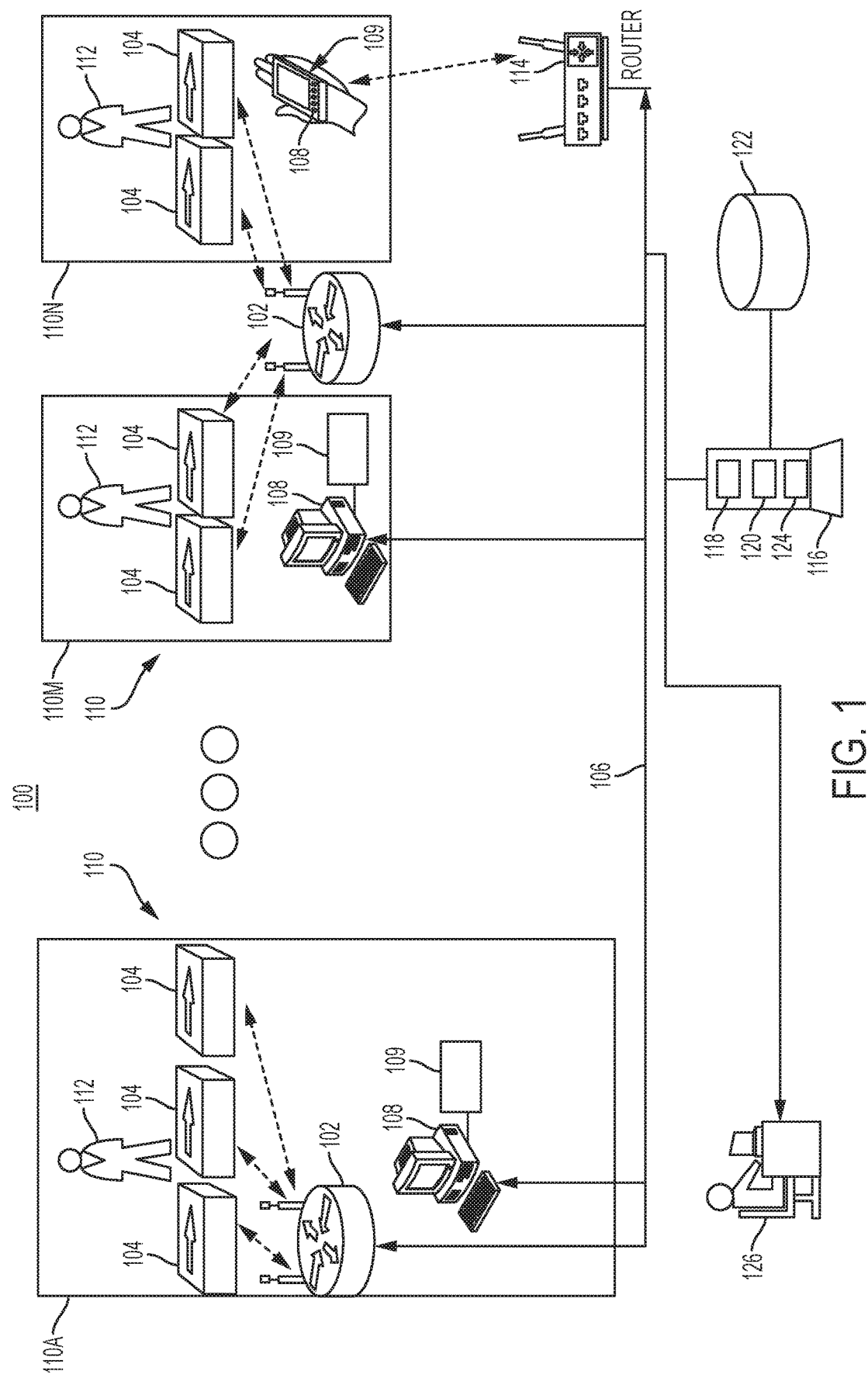
FIG. 1 depicts a block diagram of a system according to some embodiments of the present invention.

Turning now to FIG. 1, a system 100 is depicted upon which manufacturing environment management may be implemented. The system 100 includes one or more wireless access points 102 operable to communicate with a communication network 106 and one or more electronic tracking devices 104 each having an electronic-ink display (e.g., electronic-ink display 202 of FIG. 2). Electronic-ink displays are typically characterized by high visibility, high contrast, wide viewing angle, and low power supplies, and may be implemented using black-and-white, grayscale, or color electrophoretic media rather than liquid-crystal displays. The electronic tracking devices 104 (which may also be referred to as tags or ETDs) can be implemented using electronic paper (e-paper) devices configured to interface with elements of the system 100 as further described herein. The wireless access points 102 can broadcast radio signals that are unique to the electronic tracking devices 104 for real-time use, while other wireless/Wi-Fi devices (e.g., manufacturing system operator computer systems 108) communicate using a different communication protocol. The wireless access points 102 can send commands targeting specific instances or groups of the electronic tracking devices 104 and can collect status from the electronic tracking devices 104. The communication network 106 can include a combination of wired, wireless, and/or optical communication channels that support communication of multiple networked elements, such as the wireless access points 102, a plurality of manufacturing system operator computer systems 108, one or more wireless routers 114, a server 116, an administrative computer system 126, and other devices (not depicted). Some portions of the communication network 106 can be wired connections, such as communication links between the wireless access points 102 and the one or more wireless routers 114, while other portions of the communication network 106 may be wireless links, such as communication links between the manufacturing system operator computer systems 108 and the one or more wireless routers 114. Each of the manufacturing system operator computer systems 108 can be associated with at least one manufacturing work area 110, such as manufacturing work area 110A, . . . , 110M, 110N, where "N" is an arbitrary number. The administrative computer system 126 can be combined with the server 116 or may be separate from the server 116. In some embodiments, the administrative computer system 126 can communicate with the server 116 from a physically remote location, for instance, over an Internet connection or other communication network.

The manufacturing system operator computer systems 108 can be any type of computer system accessible to an operator 112 in the manufacturing work areas 110A-110N, such as a workstation, a desktop computer, a laptop computer, a tablet computer, a mobile device, a personal digital assistant, or a customized data entry system, for example. In embodiments, the manufacturing system operator computer systems 108 include or interface with a data entry interface 109 that may include a keyboard, a barcode scanner, a near-field communication interface, a camera, and/or other such input devices. The data entry interface 109 provides one or more data entry options to capture data associated with the electronic tracking devices 104. For example, if the electronic tracking devices 104 include one or more barcodes or quick response (QR) codes, a barcode scanner of the data entry interface 109 can be used to scan the codes on the electronic tracking devices 104 and/or other codes associated with the operator 112 and the manufacturing work areas 110A-110N for tracking manufacturing process initiation, completion, and other events. Alternatively, identification codes can be manually entered through a keyboard or touch sensitive interface of the data entry interface 109 to record information and/or events. Further, in embodiments that include a camera in the data entry interface 109, codes can be captured as image files and digitally processed to identify codes or symbols within the captured images. In embodiments that support near-field communication, one of the electronic tracking devices 104 associated with a process step can be placed in close physical proximity to the data entry interface 109 for near-field based detection. Each of the electronic tracking devices 104 can be associated with one or more parts. For example, an operator 112 in manufacturing work area 110A may be actively performing a manufacturing process step on a first group of parts, while another group of parts is waiting to be transported to the next one of the manufacturing work areas 110, and another group of parts may be waiting to start processing at the manufacturing work area 110A with different electronic tracking devices 104 assigned to each of the three groups of parts. Similarly, multiple groups of parts at manufacturing work areas 110M, 110N may each have separate instances of electronic tracking devices 104 assigned to corresponding groups of parts.

In the example of FIG. 1, there is at least one wireless router 114 operable to communicate with the communication network 106 and at least one of the manufacturing system operator computer systems 108, such as the manufacturing system operator computer system 108 of manufacturing work area 110N. However, it will be understood that there can be additional wireless routers 114 or no wireless routers 114 depending on the communication needs of the manufacturing system operator computer systems 108. In embodiments that include at least one wireless router 114, the one or more wireless access points 102 can be configured to communicate wirelessly with one or more electronic tracking devices 104 using a different communication protocol than the wireless router 114 uses to communicate with the manufacturing system operator computer systems 108.

The server 116 is operable to communicate with the communication network 106 and includes a processing system 118 and a memory system 120 in communication with the processing system 118. The server 116 can also include a timer 124 and other elements known in the art to support computer system operation. The memory system 120 can include a manufacturing system database 122 that may be within the server 116 or externally linked to the server 116, such as on a hard disk drive, optical readable media, magnetically readable media, a memory stick, a storage network, a cloud-based storage system, and/or other storage options known in the art. The manufacturing system database 122 can be a structured query language (SQL) compliant database and may be formatted as a relational database, for instance. The memory system 120 can include one or more memory devices, also referred to herein as "computer-readable memory" or "a storage medium" (e.g., non-transitory memory devices as opposed to transmission devices or media), and may generally store program instructions, code, and/or modules that, when executed by the processing system 118 (e.g., one or more microprocessor), cause a particular machine to function in accordance with one or more embodiments described herein. For example, the memory system 120 can include instructions executable by the processing system 118 to perform actions that support tracking of parts through the manufacturing work areas 110 using the electronic tracking devices 104. The server 116 can manage access to the manufacturing system database 122 based on user permissions and/or computer system identifiers. For example, a user of the administrative computer system 126 can be granted additional write and/or read permissions beyond the permissions granted to the operators 112 of the manufacturing system operator computer systems 108. The administrative computer system 126 can be any type of computer system known in the art operable to interface with the server 116. Further details regarding elements of the system 100 are provided herein.

Figure 2:
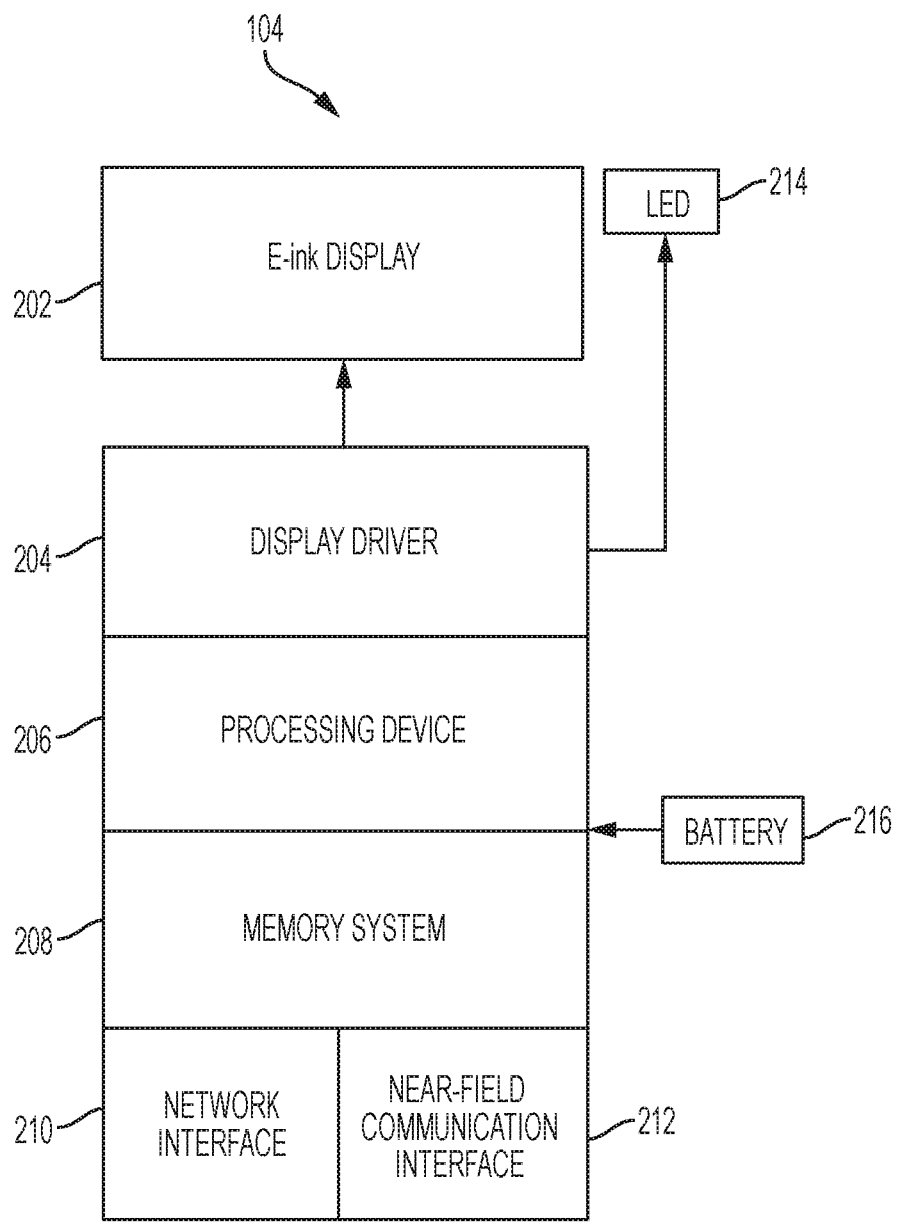
FIG. 2 depicts a block diagram of an electronic tracking device according to some embodiments of the present invention.

FIG. 2 depicts a block diagram of one of the electronic tracking devices 104 of FIG. 1 according to an embodiment. The electronic tracking device 104 includes an electronic-ink display 202, a display driver 204, a processing device 206, a memory system 208, and a network interface 210 operable to communicate with one or more wireless access points 102 of FIG. 1. In some embodiments, the electronic tracking device 104 includes a near-field communication interface 212 operable to provide data to and/or exchange data with a compatible device, such as a near-field communication enabled embodiment of the data entry interface 109 of FIG. 1. The electronic tracking device 104 can also include one or more light emitting diodes 214, for instance, to display status information associated with the electronic tracking device 104. The electronic tracking device 104 may include address, control, and/or data connections to enable appropriate communications among the aforementioned components. The electronic-ink display 202 can be any type of commercially available electronic-ink based device, such as two or three color dot matrix e-paper, sized according to the amount of information intended to be displayed. For instance, the electronic-ink display 202 can range between 1.5 inches and 7.5 inches in size, although larger and smaller sizes are contemplated. The display driver 204 is operable to convert display commands from the processing device 206 into e-ink state configurations targeting specific locations on the electronic-ink display 202 (e.g., set a matrix location to a desired color). In some embodiments, the electronic tracking device 104 receives display commands via the network interface 210 using a proprietary encoded communication format, and the processing device 206 interprets/converts the proprietary encoded communication format into display commands for the display driver 204. For instance, the server 116 of FIG. 1 can send commands to the one or more wireless access points 102 of FIG. 1 in an industry-standard format, such as JavaScript Object Notation (JSON), and the one or more wireless access points 102 of FIG. 1 can interpret/convert the commands from the industry-standard format of the server 116 to the proprietary encoded communication format of the network interface 210. The memory system 208 can hold files/commands received on the network interface 210, status information, executable instructions for the processing device 206 and/or other volatile or non-volatile data.

The processing device 206 comprises a hardware device for executing software, particularly software stored in the memory system 208. The processing device 206 may comprise any custom made or commercially available computer processor, a central processing unit (CPU), an auxiliary processor among several processors associated with the electronic tracking device 104, a semiconductor-based microprocessor (in the form of a microchip or chip set), a macro-processor, or generally any device for executing instructions. To conserve power of battery 216, the processing device 206 may comprise low-power, low-complexity processing circuitry.

The memory system 208 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disk read only memory (CD-ROM), flash drive, disk, hard disk drive, diskette, cartridge, cassette or the like, etc.). Moreover, the memory system 208 may incorporate electronic, magnetic, optical, and/or other types of storage media. Accordingly, the memory system 208 is an example of a tangible computer readable storage medium upon which instructions executable by the processing device 206 may be embodied as a computer program product. The memory system 208 may be integrated with the processing device 206 and sized/selected to reduce power consumption of the battery 216.

Figure 3:
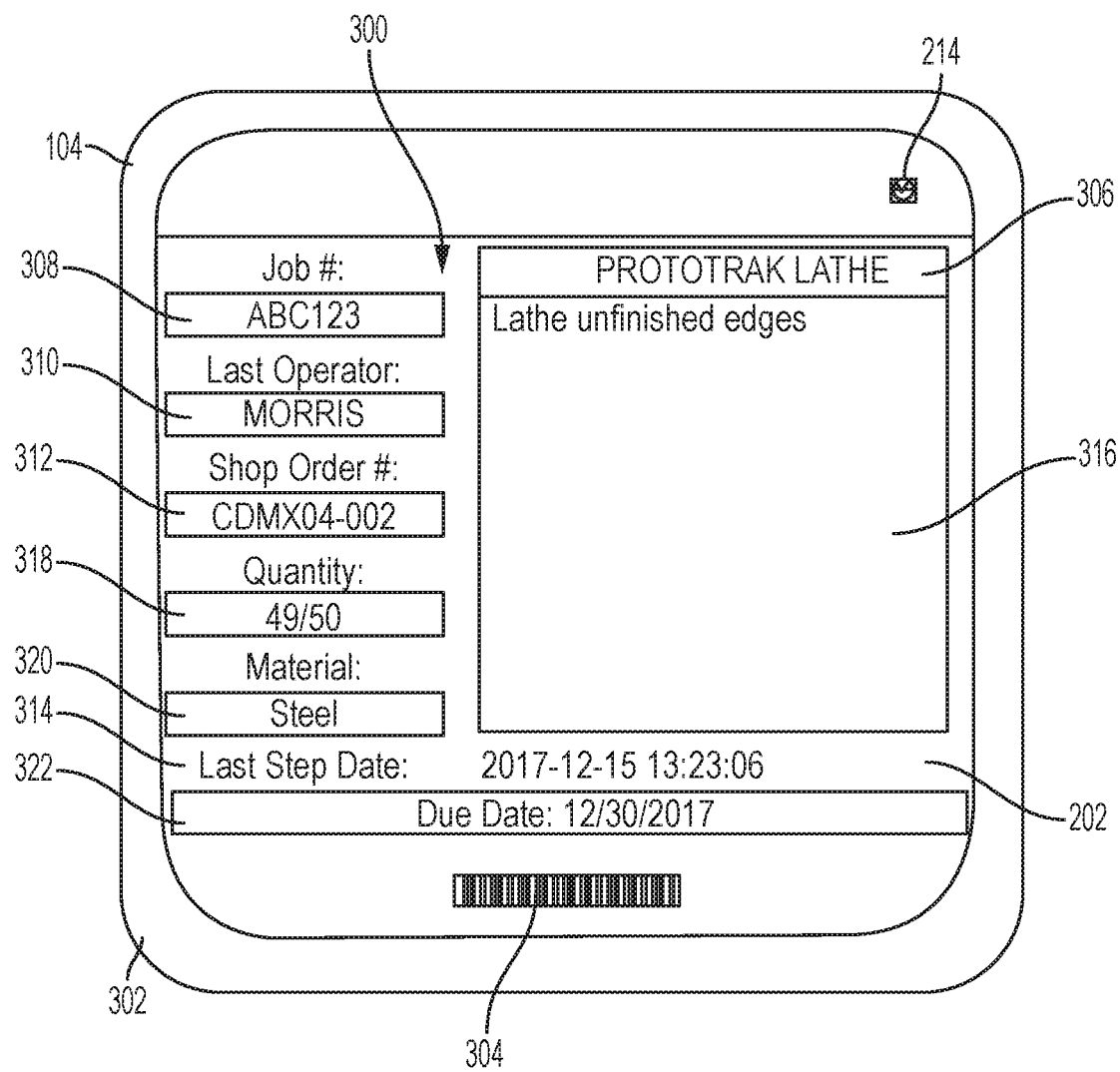
FIG. 3 depicts an example visual interface of an electronic tracking device according to some embodiments of the present invention.

FIG. 3 depicts an example visual interface 300 of an electronic tracking device 104 according an embodiment of the present invention. A housing 302 of the electronic tracking device 104 provides a supporting structure for the electronic-ink display 202 and light emitting diode 214. A device identifier 304 of the electronic tracking device 104 may be embodied as a barcode, an alphanumeric code, or other such indicator. The visual interface 300 depicted on the electronic-ink display 202 of the electronic tracking device 104 can include a variety of elements to assist in tracking the status of an order, manufacturing process steps completed, and a manufacturing process step to be performed. For example, the visual interface 300 can display a process step identifier 306, an order number identifier 308, an operator identifier 310, a part number identifier 312, a last manufacturing process step completed indicator 314, and at least one instruction 316 for performing the current manufacturing process step. The process step identifier 306 may identify the work area and/or manufacturing equipment to be used in the current manufacturing process step. The order number 308 can be an alphanumeric field that uniquely identifies a job number or work order number. The operator identifier 310 may list the last operator to complete the previous manufacturing process step. The last manufacturing process step completed indicator 314 may indicate when (e.g., a date and time) the previous manufacturing process step was completed. Other information can be depicted, such as a quantity of parts 318 to be produced (which may distinguish between an original order amount and a number of parts in process to complete the order), a material 320 of the parts, and/or a due date or priority 322 of the parts. Values displayed on the visual interface 300 can be set based on receiving a display update for the electronic-ink display 202 of the electronic tracking device 104 through at least one of the one or more wireless access points 102 of FIG. 1, for instance, upon completion/transition of the current manufacturing process step to a next manufacturing process step.

Figure 4:
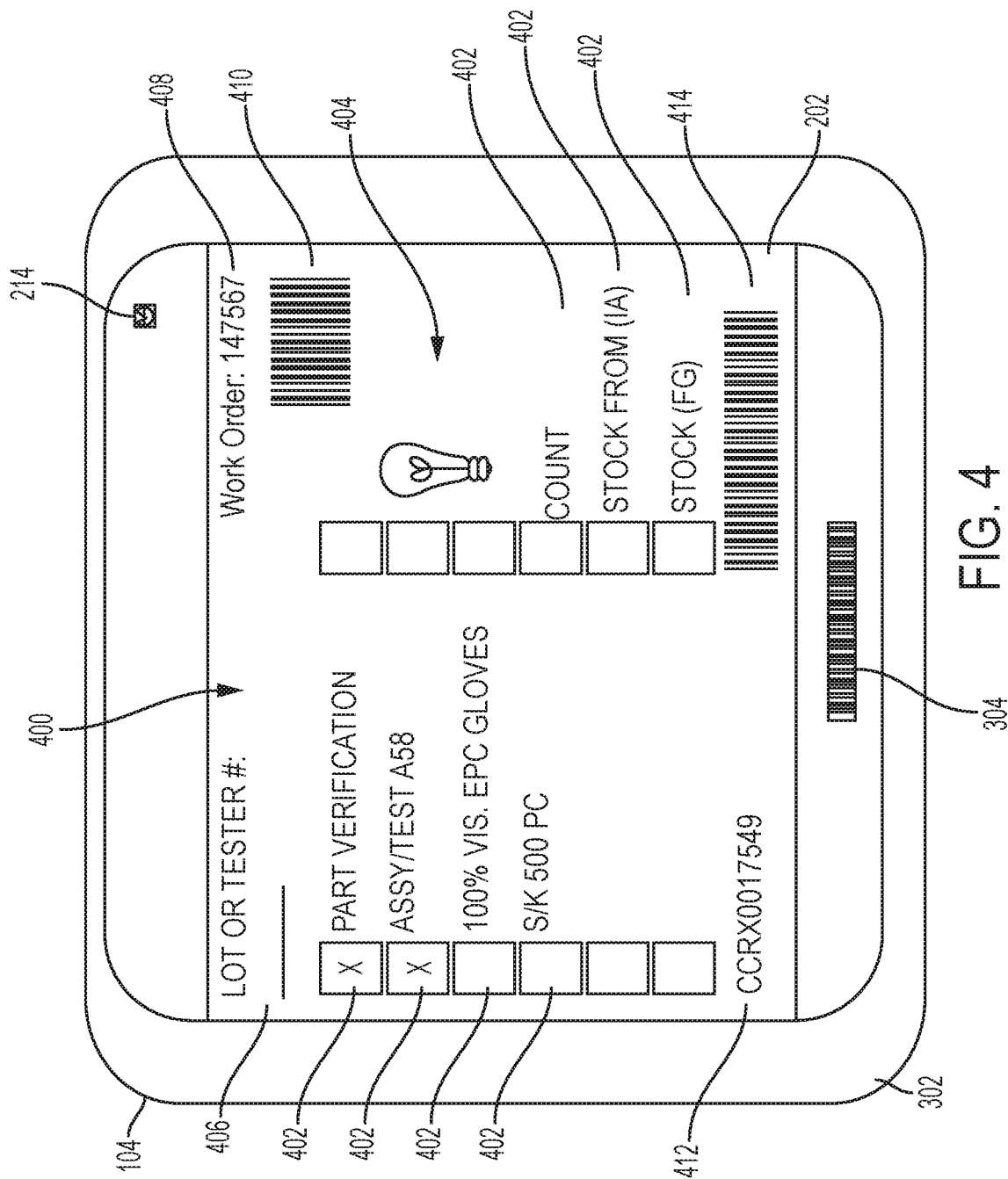
FIG. 4 depicts another example of a visual interface of an electronic tracking device according to some embodiments of the present invention.

FIG. 4 depicts another example of a visual interface 400 of an electronic tracking device 104 according to an embodiment of the present invention. Similar to the example of FIG. 3, the electronic tracking device 104 depicted in FIG. 4 includes a housing 302 that provides a supporting structure for the electronic-ink display 202 and light emitting diode 214. Device identifier 304 of the electronic tracking device 104 in FIG. 4 may be embodied as a barcode, an alphanumeric code, or other such indicator. The visual interface 400 depicted on the electronic-ink display 202 of the electronic tracking device 104 can include a variety of elements to assist in tracking the status of an order, manufacturing process steps completed, and a manufacturing process step to be performed. For example, the visual interface 400 can display multiple checkboxes with step descriptions 402 indicative of whether manufacturing process steps have been completed or not. The visual interface 400 may also include one or more graphical elements 404. A lot or tester number field 406 can be displayed as one type of tracking identifier. Further, a work order number 408 may be displayed with a corresponding work order barcode 410 to enable rapid data entry at the manufacturing system operator computer systems 108. A part number identifier 412 and a corresponding part number bar code 414 may be displayed to enable rapid data entry at the manufacturing system operator computer systems 108. It will be understood that other fields, codes, formats, and values may be displayed in embodiments.

Figure 5:
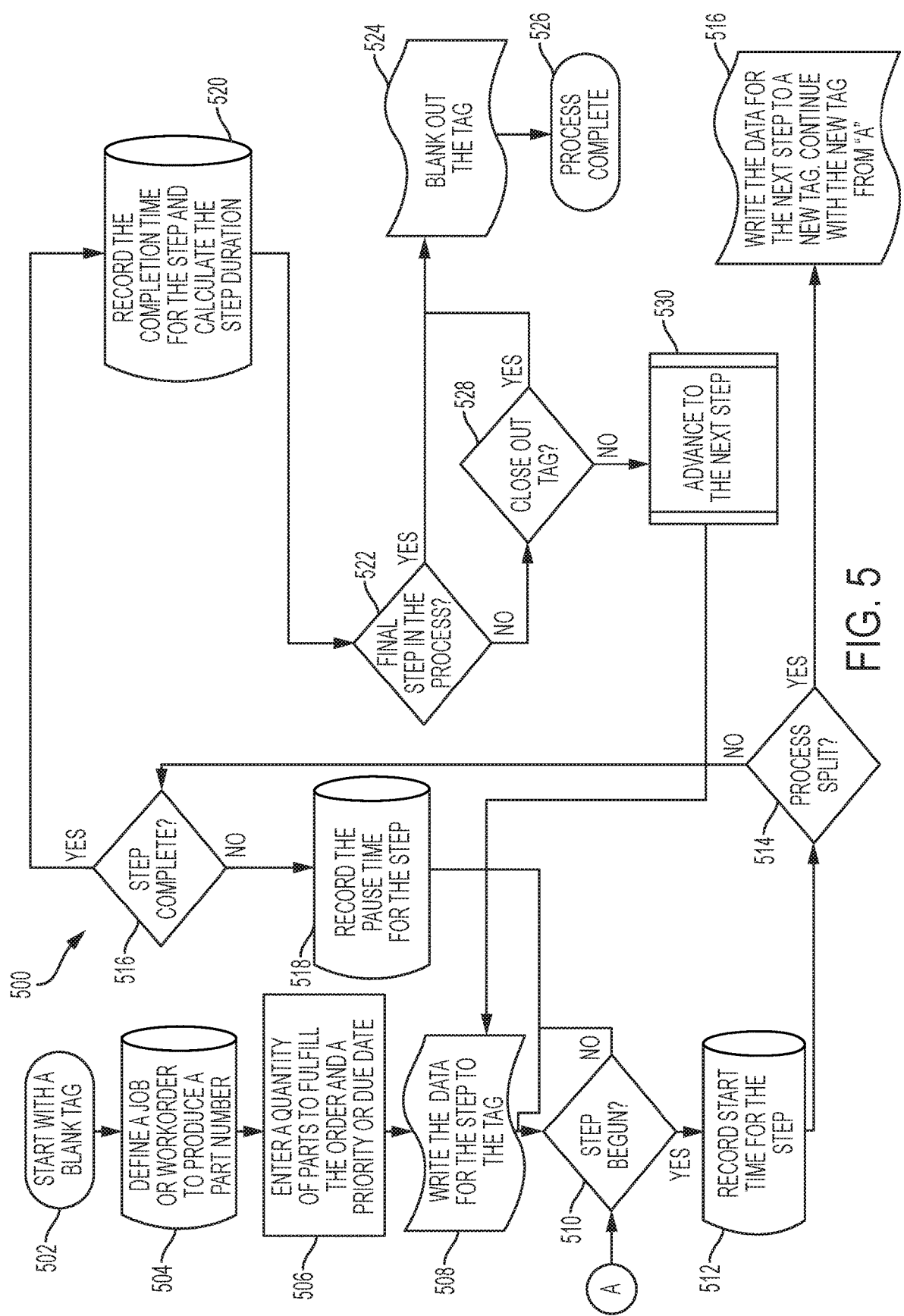
FIG. 5 depicts a process flow according to some embodiments of the present invention.

FIG. 5 depicts a process flow 500 according to an embodiment and is described in reference to FIGS. 1-5. The process flow 500 may be performed using elements of the system 100 of FIG. 1 with steps added, removed, combined, or further subdivided. At block 502, an unassigned (blank) instance of an electronic tracking device 104 is identified for assignment. At block 504, the administrative computer system 126 can access the server 116 to enter values in the manufacturing system database 122 such as defining a job or work order to produce a part number. The part number may already be defined in the manufacturing system database 122 including a specific sequence of manufacturing process steps and equipment needed to produce one or more corresponding parts. At block 506, the administrative computer system 126 can access the server 116 to enter additional values in the manufacturing system database 122, such as a quantity of parts to fulfill the order and a priority or due date. Upon completion of order data entry into the manufacturing system database 122, the server 116 writes data to the electronic tracking device 104 identified at block 502 through one of the wireless access points 102 in physical proximity to the electronic tracking device 104.

At block 510, the server 116 monitors for a starting event at the manufacturing system operator computer systems 108 to determine whether a manufacturing process step has begun. For example, when materials or partially processed parts arrive at one of the manufacturing work areas 110, an operator 112 can scan or otherwise enter data, such as device identifier 304, at one of the manufacturing system operator computer systems 108 to confirm that the manufacturing process step is starting. At block 512, the server 116 records a start time of the manufacturing process step in the manufacturing system database 122 responsive to determining that the step has begun at block 510. The timer 124 of the server 116 can be used to determine the start time such that any timing/clock variations between the manufacturing system operator computer systems 108 do not impact the accuracy of time-based tracking.

At block 514, the server 116 determines whether a process split has been requested to break a portion of the parts off from the current manufacturing process step and advance parts, where a portion of the manufacturing process step has been completed prior to completing the current manufacturing process step for all parts associated with the electronic tracking device 104. A process split may be initiated through one of the manufacturing system operator computer systems 108 by an operator 112 performing the current manufacturing process step. At block 516, the server 116 determines a next manufacturing process step to be performed based on predefined process sequence data in the manufacturing system database 122 and writes the associated data to a second instance of the electronic tracking device 104 to travel with the split parts to the next manufacturing process step. The tracking associated with the second instance of the electronic tracking device 104 continues at block 510 to monitor for starting of the next manufacturing process step for the split group of parts.

If there is no process split at block 514, then at block 516, the server 116 monitors for a completion event at the manufacturing system operator computer systems 108 to determine whether the current manufacturing process step has been completed. For example, when the current manufacturing process step is finished at one of the manufacturing work areas 110, an operator 112 can scan or otherwise enter data, such as device identifier 304, at one of the manufacturing system operator computer systems 108 to confirm that the current manufacturing process step has been completed. If the current manufacturing process step is not yet completed at block 516 and a pause event is detected at one of the manufacturing system operator computer systems 108, then at block 518, the pause time is recorded in the manufacturing system database 122, and the process flow 500 returns to block 510 waiting to begin/resume. If the current manufacturing process step is completed at block 516, the completion time is recorded in the manufacturing system database 122 and the step duration is calculated, which may also be recorded in the manufacturing system database 122.

At block 522, the server 116 determines whether the most recently completed manufacturing process step was the final step in the process according to the predefined sequence of manufacturing process steps defined in the manufacturing system database 122. If the manufacturing process steps are all complete, then at block 524, the electronic tracking device 104 is blanked out/reset, and the process flow 500 is complete at block 526. If the manufacturing process steps are not all complete and the electronic tracking device 104 is associated with a completed process split such that the electronic tracking device 104 is no longer needed, then at block 528, the process flow 500 continues to block 524 to blank out/reset the electronic tracking device 104. If the electronic tracking device 104 is not associated with completion of a process split at block 528, then the process flow 500 continues to block 530. At block 530, the server 116 can access the manufacturing system database 122 to determine the next manufacturing process step and write a display update to the electronic tracking device 104 through one or more wireless access points 102 at block 508. For instance, the electronic-ink display 202 may be updated to include the operator identifier 310 of the most recently completed manufacturing process step along with the last manufacturing process step completed indicator 314, new data for the process step identifier 306, and least one instruction 316 for the next manufacturing process step. The update may also include a change to the due date or priority 322 of the parts. Using the wireless access points 102 allows the electronic tracking devices 104 to be updated at a number of physical locations without having to return the electronic tracking devices 104 to the location of the administrative computer system 126, for example.

Figure 6:
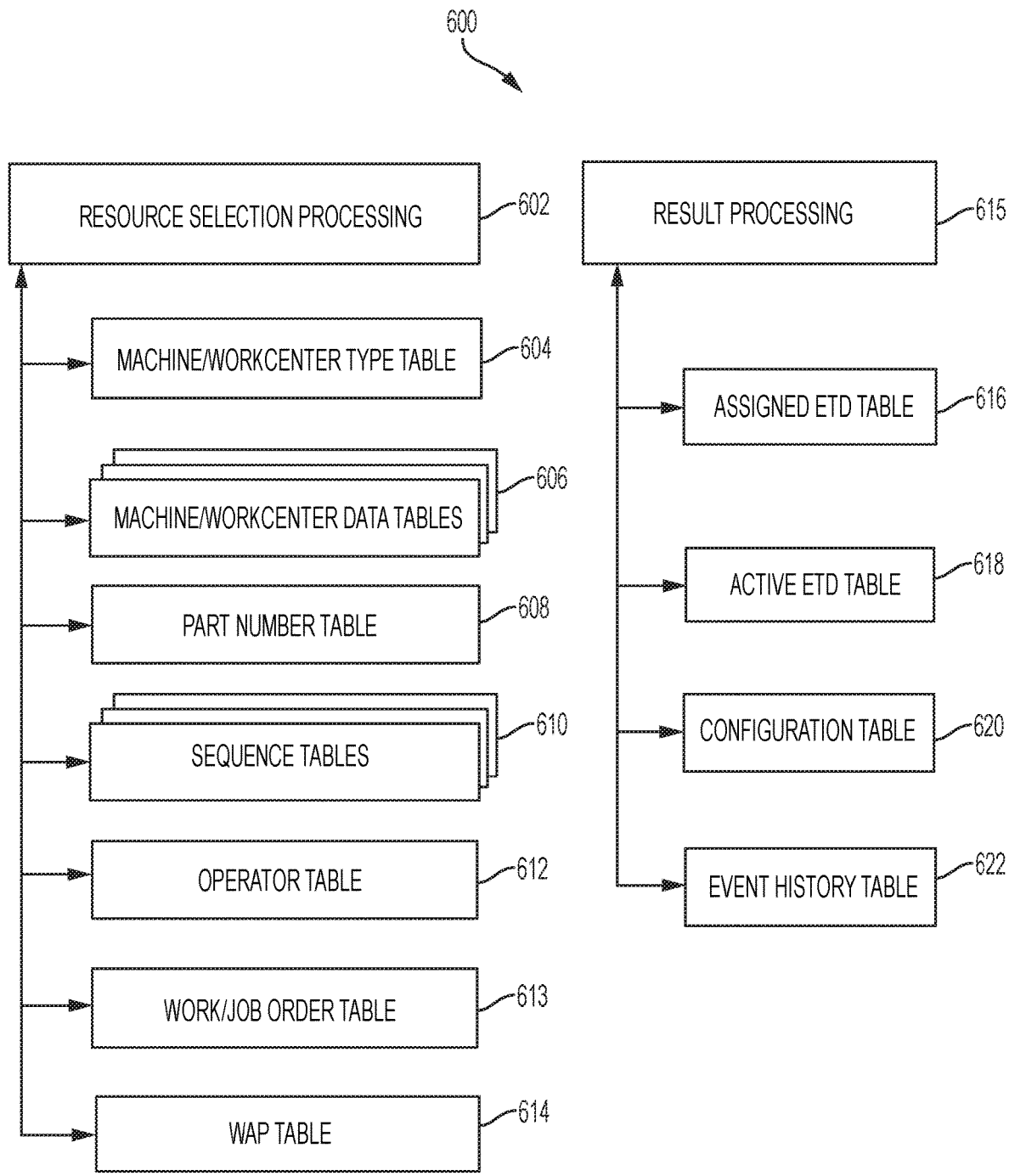
FIG. 6 depicts an example of various tables according to some embodiments of the present invention.

FIG. 6 depicts an example of various tables 600 that may be incorporated within the manufacturing system database 122 of FIG. 1. Resource selection processing 602 of the server 116 of FIG. 1 can be used to set process parameters and outgoing information to the electronic tracking devices 104. For example, a machine/workcenter type table 604 can list available types of machines or workcenters in the manufacturing work areas 110. Examples can include aluminum cutoff saws or assembly benches. The machine/workcenter type table 604 can include every type of available machine or workcenter available at the manufacturing work areas 110 in a physical plant. A plurality of machine/workcenter data tables 606 can be defined to capture details of each machine type or workcenter in the manufacturing work areas 110. For instance, a table for an aluminum cutoff saw can list each specific cutoff saw machine. Tracking specific machine data can assist in identifying performance issues with specific machines and may assist with planning and tracking of part movement between specific machines. A part number table 608 can list all of the parts that have an assigned production process including a plurality of predefined manufacturing process steps. A plurality of sequence tables 610 can be defined to include the processing sequence steps to produce each part number from the part number table 608. For example, the sequence tables 610 can include the machine types, and if specified, specific machines, in sequential order of processing, that are required to produce a part. The sequence tables 610 may also hold text based notes for the operators 112 with specific instructions for processing the corresponding part number at a specific step. An operator table 612 can include names and identifiers of operators 112 that are authorized to operate machines or work at the manufacturing work areas 110. A work/job order table 613 can include due dates and/or priority of work/job orders. A wireless access point table 614 can include information about each of the wireless access points 102, such as addressing information, protocol information, availability, and other such information.

Result processing 615 of the server 116 of FIG. 1 can be used to collect outputs and configure elements of the system 100 of FIG. 1. An assigned electronic tracking device table 616 can track for each specific work order the relevant information to be displayed on the electronic tracking devices 104 assigned to the work order. An active electronic tracking device table 618 can include a list of all electronic tracking devices 104 with time actively being recorded (e.g., started but not paused or completed). A configuration table 620 can include current system settings that may be used to customize display elements of the electronic tracking devices 104 and user interfaces of the manufacturing system operator computer systems 108 and administrative computer system 126. An event history table 622 can capture observed events/actions, such as creating a work order, pausing a step, finishing a step, splitting off a step onto a new electronic tracking device 104, as well as administrator actions, such as flagging an operator 112, or changing the due date/priority/quantity of a specific work order. At any time a step is paused, finished or split, the operator 112 can input notes for any pertinent information and enter a new quantity, in case any parts were damaged or lost during processing.

FIG. 7 depicts an interactive user interface 700 to create a new job according to an embodiment of the present invention. The interactive user interface 700 may be accessed by the administrative computer system 126 through the server 116 and manufacturing system database 122 of FIG. 1. In the example of FIG. 7, the interactive user interface 700 can include one or more data input fields 702, an operational status 704 of the one or more wireless access points 102, a pending operation status 706, and a graphical depiction 708 of content to be displayed on the electronic-ink display 202 of an electronic tracking device 104 identified for updating. The data input fields 702 can include, for example, a device identifier field 710 corresponding to a device identifier 304 of the electronic tracking device 104, a part number field 712, a job number field 714, a quantity field 716, and a due date field 718 that may be populated by blocks 504 and 506 of process flow 500 of FIG. 5. The interactive user interface 700 can also include command buttons 720 to initiate creation/updating of records in the manufacturing system database 122, trigger writing of updated display information as shown in the graphical depiction 708 to the electronic tracking device 104 through the one of the wireless access points 102, and/or navigation controls. It will be understood that additional or fewer elements can be included in the interactive user interface 700. Further, warning messages may be displayed on the interactive user interface 700 when an error condition is detected, such as a communication issue with one of the wireless access points 102 or a write timeout when updating the electronic tracking device 104.

Figure 8:
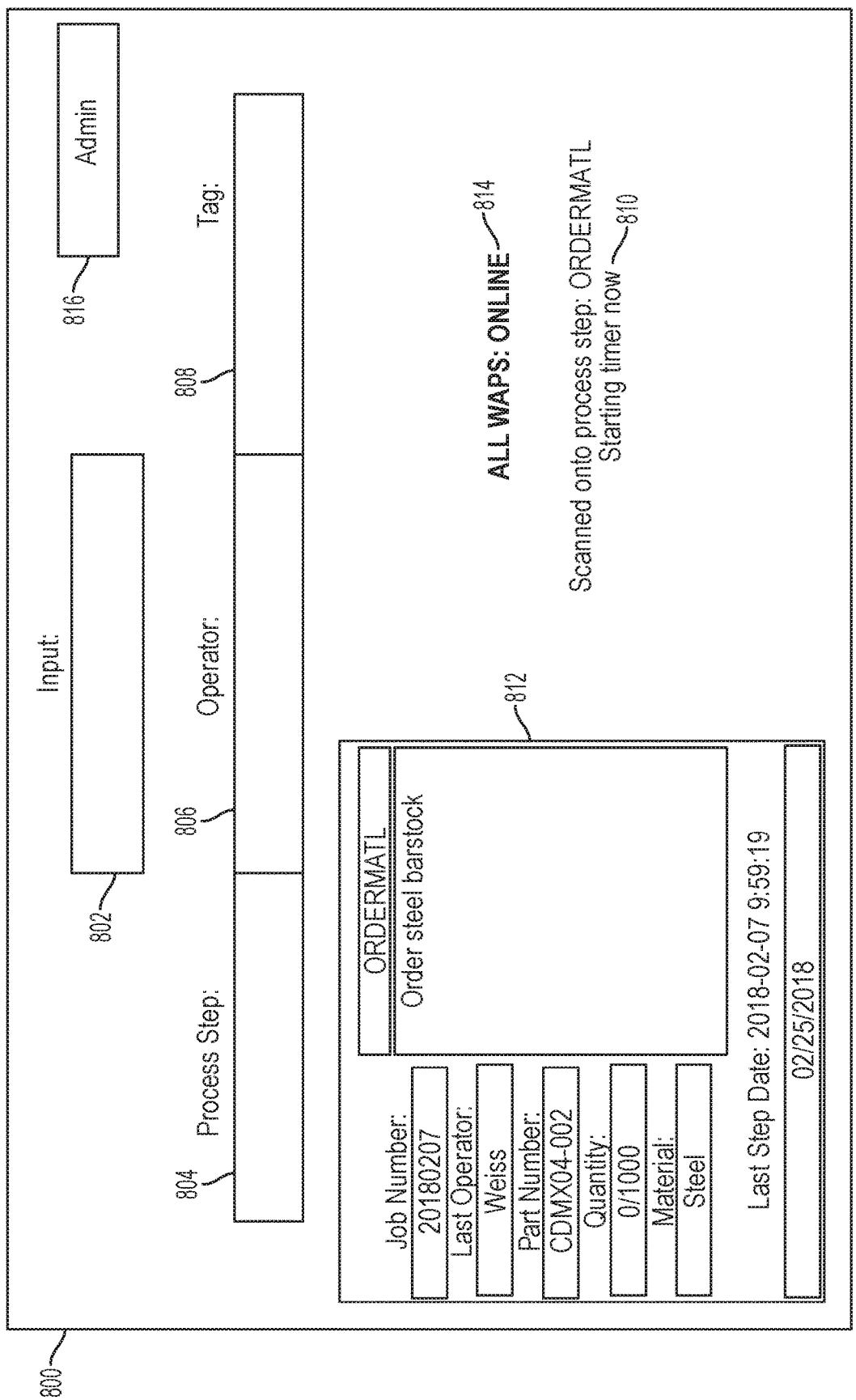
FIG. 8 depicts an interactive user interface to track initiation of part processing according to some embodiments of the present invention.

FIG. 8 depicts an interactive user interface 800 to track initiation of part processing according to an embodiment of the present invention. The interactive user interface 800 can include a data input field 802 that accepts data entered through a data entry interface 109 of the manufacturing system operator computer systems 108. The formatting of the data entered in the data input field 802 can be used to detect whether the data maps to a process step 804, an operator identifier 806, or a device identifier 808 associated with an electronic tracking device 104. As an example, where scanned as a barcode or manually entered, an identifier for a process step may have a different code prefix than an identifier for an operator 112 or an electronic tracking device 104. Barcodes on machines or within manufacturing work areas 110 can be mapped to process steps through the manufacturing system database 122. Thus, upon preparing to perform a manufacturing process step, an operator 112 can scan a barcode in the current manufacturing work area 110 to establish the process step 804, scan an operator barcode (e.g., on an employee badge) to establish the operator identifier 806, and scan the device identifier 304 of the electronic tracking device 104 to establish the device identifier 808. In embodiments, when at block 510 of FIG. 5), and a timer status 810 associated with the current manufacturing process step may be displayed (e.g., starting timer indicator) on the interactive user interface 800.

Upon inputting/scanning the device identifier 808, the interactive user interface 800 may display a copy of the electronic-ink display 202 as a graphical depiction 812. This can assist in confirming that the desired instance of the electronic tracking devices 104 has been processed. The graphical depiction 812 may also be viewed remotely, for instance, by the administrative computer system 126 to confirm the current display contents of a particular electronic tracking device 104 and progress through the manufacturing process steps. In some embodiments, the graphical depiction 812 may be unavailable or blocked from remote viewing. The interactive user interface 800 may also display an operational status 814 of the one or more wireless access points 102 and provide one or more command buttons 816, for instance, to perform administrative operations not normally accessible to operators 112 of the manufacturing system operator computer systems 108.

Figure 9:
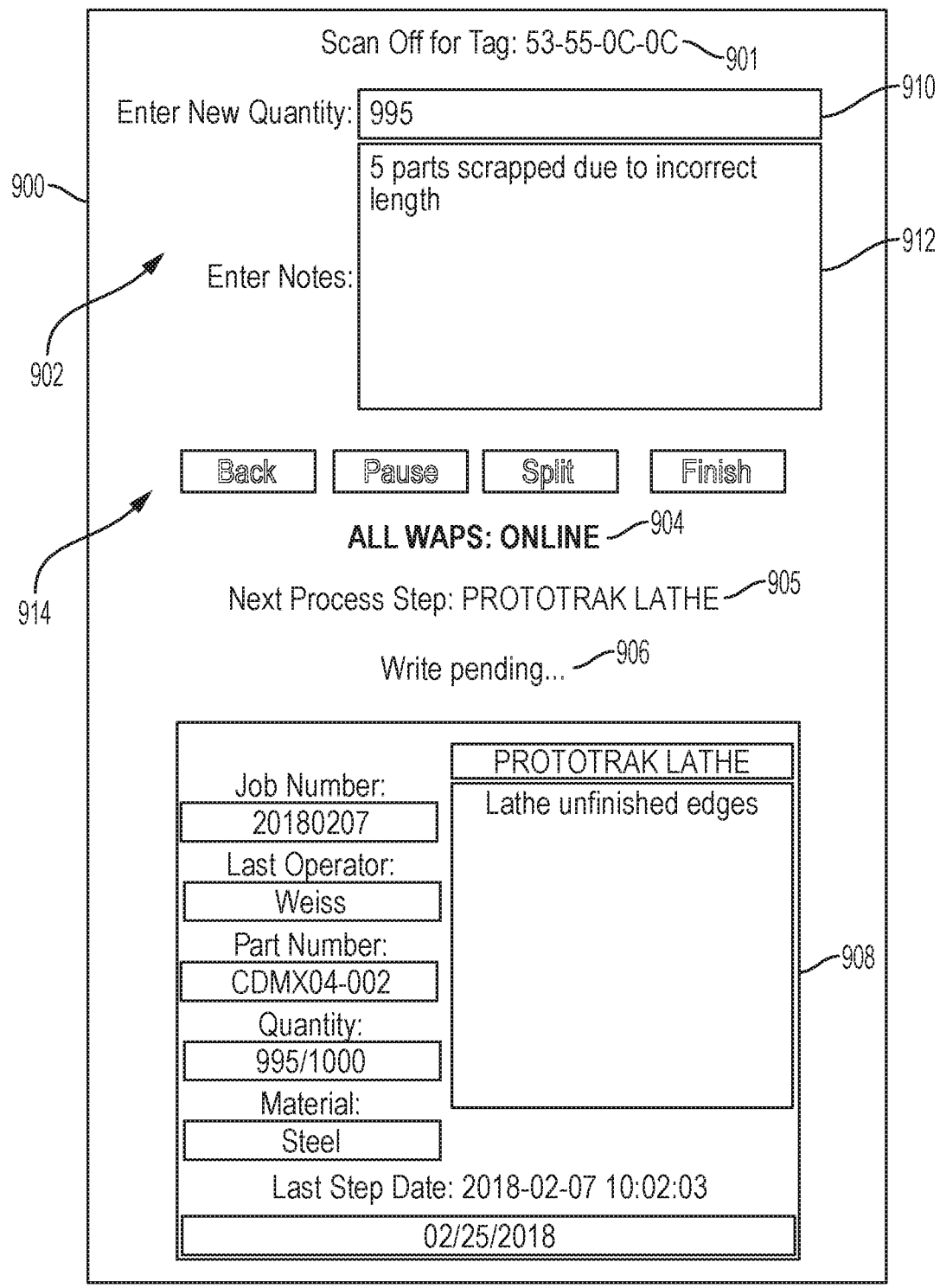
FIG. 9 depicts an interactive user interface to track completion of part processing according to some embodiments of the present invention.

FIG. 9 depicts an interactive user interface 900 to track completion of part processing according to an embodiment of the present invention. The interactive user interface 900 may be accessed by the manufacturing system operator computer systems 108 through the server 116 and manufacturing system database 122 of FIG. 1. In the example of FIG. 9, the interactive user interface 900 can include a device identifier 901, one or more data input fields 902, an operational status 904 of the one or more wireless access points 102, an indicator of a next manufacturing process step 905, a pending operation status 906, and a graphical depiction 908 of content to be displayed on the electronic-ink display 202 of an electronic tracking device 104 identified for updating. The data input fields 902 can include, for example, a quantity adjustment field 910 to modify a number of parts going forward based on results of the current manufacturing process step and a notes field 912 that supports entry of text to describe any issues associated with the current manufacturing process step. The interactive user interface 900 can also include command buttons 914 to initiate a pause operation to stop accumulating time against the current manufacturing process step, a process split operation, a finish operation operable to stop accumulating time and update the electronic-ink display 202 responsive to the transition, and/or navigation controls. It will be understood that additional or fewer elements can be included in the interactive user interface 900. Further, warning messages may be displayed on the interactive user interface 900 when an error condition is detected, such as a communication issue with one of the wireless access points 102 or a write timeout when updating the electronic tracking device 104.

FIG. 10 depicts an interactive user interface 1000 for process splitting according to an embodiment of the present invention. The interactive user interface 1000 may be accessed by the manufacturing system operator computer systems 108 through the server 116 and manufacturing system database 122 of FIG. 1. In the example of FIG. 10, the interactive user interface 1000 can include one or more data input fields 1002, an operational status 1004 of the one or more wireless access points 102, an indicator of a next manufacturing process step 1005, a pending operation status 1006, and a graphical depiction 1008 of content to be displayed on the electronic-ink display 202 of an electronic tracking device 104 identified for updating. The data input fields 1002 can include, for example, a device identifier field 1010 corresponding to a device identifier 304 of the electronic tracking device 104, an operator identifier field 1012, a quantity adjustment field 1014 to modify a number of parts going forward in the split, and a notes field 1016 that supports entry of text to describe details associated with the split. The interactive user interface 1000 can also include command buttons 1020 to submit the split event to be captured in the manufacturing system database 122, triggering writing of updated display information as shown in the graphical depiction 1008 to the electronic tracking device 104 through the one of the wireless access points 102, and/or navigation controls. It will be understood that additional or fewer elements can be included in the interactive user interface 1000. Further, warning messages may be displayed on the interactive user interface 1000 when an error condition is detected, such as a communication issue with one of the wireless access points 102 or a write timeout when updating the electronic tracking device 104.

FIG. 11 depicts an active job report 1100 according to an embodiment of the present invention. The active job report 1100 indicates electronic tracking devices 104 that are actively in use prior to completing a final manufacturing process step. The active job report 1100 can display the contents of the assigned electronic tracking device table 616 and/or the active electronic tracking device table 618, as well as additional related fields linked from other tables 600 of FIG. 6 in the manufacturing system database 122. In the example of FIG. 11, a plurality of columns are depicted including a device identifier 1102, a last manufacturing process step 1104, a current manufacturing process step 1106, a current step type 1108, a current step number 1110, an operator identifier 1112, a job number 1114, a specified quantity 1116, an actual quantity 1118, a material 1120, a due date 1122, a part number 1124, a start date 1126, and a last step complete date 1128. The active job report 1100 provides a snapshot of parts presently in various manufacturing process steps to avoid having to physically visit multiple manufacturing work areas 110 to determine status, making the information remotely available through the administrative computer system 126. Logging status data in the manufacturing system database 122 as updates are made can reduce latency and network traffic that could occur in query-based on-demand construction of the active job report 1100 if tracking data was only locally stored within the electronic tracking devices 104 and status request messages were broadcast to the electronic tracking devices 104. Although a particular configuration is depicted in the example of FIG. 11, it will be understood that other combinations are contemplated including additional or fewer fields.

Figure 12:
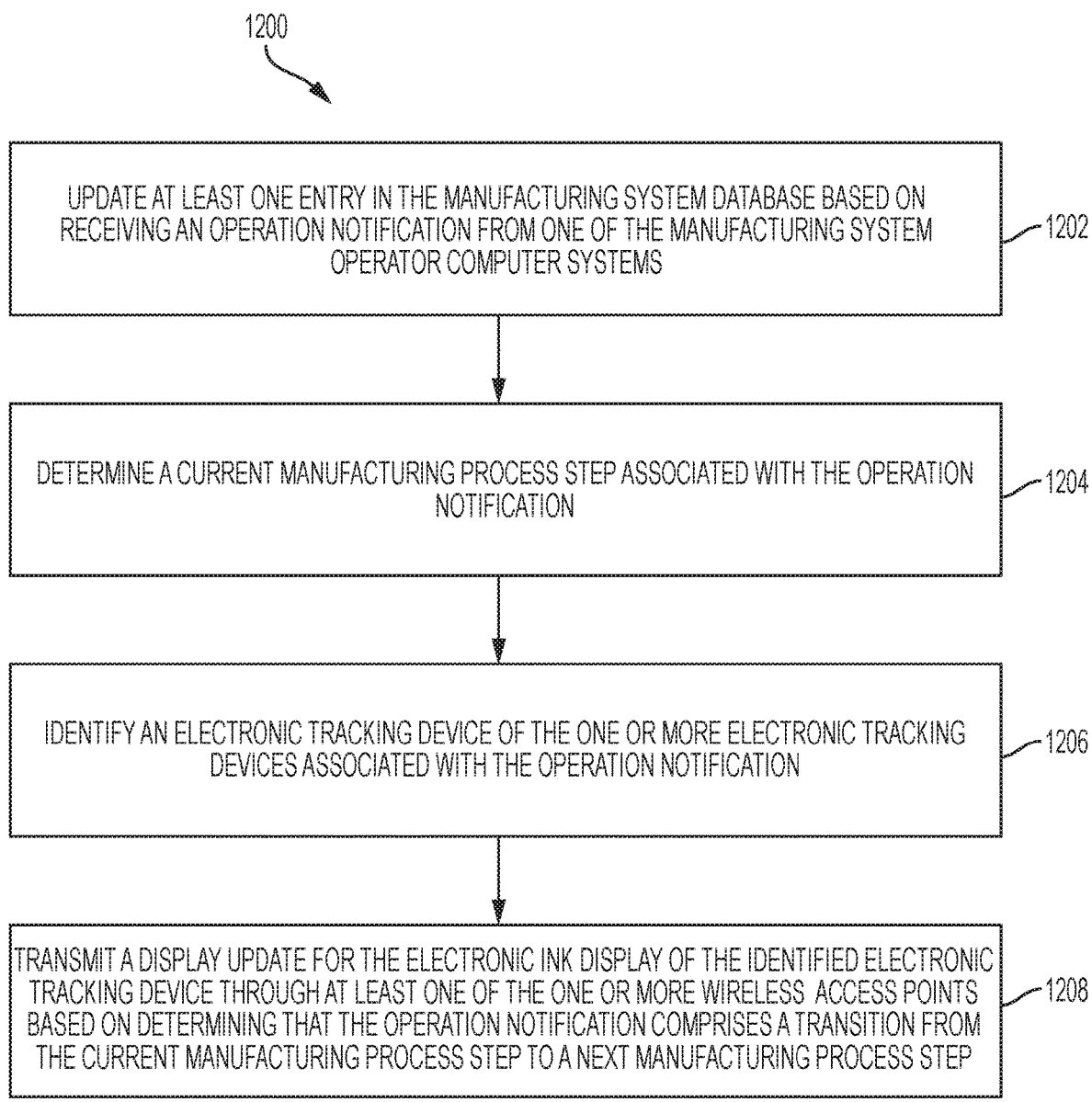
FIG. 12 depicts a process flow according to some embodiments of the present invention.

Turning now to FIG. 12, a process flow 1200 is depicted according to an embodiment. The process flow 1200 includes a number of steps that may be performed in the depicted sequence or in an alternate sequence and is described with respect to FIGS. 1-12. The process flow 1200 may be performed by the system 100 of FIG. 1. In one embodiment, the process flow 1200 is performed by the server 116.

As preliminary steps, blocks 502-508 of process flow 500 can be performed through the interactive user interface 700 for one or more electronic tracking devices 104 as orders for parts to be manufactured are received and processed through the administrative computer system 126 and server 116. In embodiments, the administrative computer system 126 can interface with the server 116 to define a plurality of order data in the manufacturing system database 122 to produce one or more parts, the order data including an order number, a part number, a quantity of parts, and a priority or due date. The administrative computer system 126 can use, for example, the interactive user interface 700 to write of at least a portion of the order data to the identified electronic tracking device 104. The administrative computer system 126 can also be used to define a number of values in the manufacturing system database 122, such as a plurality of manufacturing system configuration parameters associated with a plurality of manufacturing work areas 110, a list of manufacturing equipment available in the manufacturing work areas 110, a list of operators 112 to perform at least one manufacturing process step, a predetermined manufacturing process step sequence of manufacturing process steps to manufacture the one or more parts, a list of the one or more electronic tracking devices 104 available for assignment, and other such values (e.g., as defined in tables 600).

At block 1202, the server 116 updates at least one entry in a manufacturing system database 122 based on receiving an operation notification from one of a plurality of manufacturing system operator computer systems 108. For example, with reference to process flow 500, an operation notification can be associated with a start event as determined at block 510, a process split event as determined at block 514, a step complete event at block 516, a pause event at block 518, and/or another event type.

At block 1204, the server 116 determines a current manufacturing process step associated with the operation notification. In embodiments, the server 116 tracks a manufacturing process step status of a plurality of parts distributed between a plurality of manufacturing work areas 110 using a plurality of the electronic tracking devices 104. The server 116 can also enforce a predetermined manufacturing process step sequence defined in the manufacturing system database 122 to constrain successful data entry associated with the electronic tracking devices 104 by the manufacturing system operator computer systems 108 as the parts transition between the manufacturing work areas 110. Thus, inadvertent skipping of a manufacturing process step can be avoided by enforcing process step sequential order.

At block 1206, the server 116 identifies an electronic tracking device 104 associated with the operation notification. The identified electronic tracking device 104 can include a device identifier 304 as previously described.

At block 1208, a display update for an electronic-ink display 202 of the identified electronic tracking device 104 is transmitted through at least one wireless access point 102 based on determining that the operation notification includes a transition from the current manufacturing process step to a next manufacturing process step. For example, a process split event or a step complete event may result in an update of the electronic-ink display 202 of the identified electronic tracking device 104, while a start event or a pause event may not result in an update of the electronic-ink display 202 of the identified electronic tracking device 104. The display update can include one or more of: a process step identifier 306, an operator identifier 310, an order number identifier 308, a part number identifier 312, a last manufacturing process step completed indicator 314, at least one instruction 316 for performing the current manufacturing process step, and other such information as previously described in reference to FIGS. 3 and 4.

Detection of various event types can result in update operations to the manufacturing system database 122. For example, a start time can be recorded in the manufacturing system database 122 based on determining that the current manufacturing process step has begun responsive to a first data entry event associated with the identified electronic tracking device 104 by one of the manufacturing system operator computer systems 108. A first data entry event can include data entry at data input field 802 for the process step 804, operator identifier 806, and/or device identifier 808 at interactive user interface 800. A stop time can be recorded based on determining that the current manufacturing process step has been completed responsive to a second data entry event associated with the identified electronic tracking device 104 by one of the manufacturing system operator computer systems 108. The second data entry event can be performed by scanning the identified electronic tracking device 104 and/or other identifiers and data entry through the interactive user interface 900. The server 116 can determine a duration of the current manufacturing process step based on a difference between the stop time and the start time as adjusted in view of any detected pause events. The server 116 can also log the duration in the manufacturing system database 122 in combination with an operator identifier 806 and an operation identifier (e.g., process step 804) of the current manufacturing process step.

The interactive user interface 900 can be used to trigger a process split request that opens the interactive user interface 1000. Block 514 of process flow 500 can detect whether a process split request is received at the server 116. The server 116 is operable to access the manufacturing system database 122 and identify the next manufacturing process step. The server 116 can send data associated with the next manufacturing process step to a second electronic tracking device 104 at block 516, which may also be displayed in graphical depiction 1008. The server 116 can record a process split event in the manufacturing system database 122 identifying a first group of parts to complete the current manufacturing process step associated with the identified electronic tracking device 104 and a second group of parts to perform the next manufacturing process step associated with the second electronic tracking device 104. For instance, the first group of parts can have a current manufacturing process step performed at manufacturing work area 110M and the second group of parts having completed the current manufacturing process step at manufacturing work area 110M can be advanced to manufacturing work area 110N while the first group of parts is still be processed at manufacturing work area 110M. The server 116 can track a completion status of the first group of parts in parallel with a completion status of the second group of parts at manufacturing work areas 110M, 110N.

In some embodiments, the server 116 can send a status indicator illumination pattern to one or more selected electronic tracking devices 104, which may be initiated through the administrative computer system 126. For example, a status indicator can be transmitted to an identified electronic tracking device configured to illuminate the light emitting diode 214 according to a status indicator illumination pattern. The illumination pattern (e.g., a flashing light pattern) can be used to assist in physically locating one or more of the electronic tracking devices 104. In some embodiments, the illumination pattern may indicate a message or warning, such as an impending due date/time, an overdue work order, a notification of an update to the electronic-ink display 202, a check battery warning, or other such encoded information.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseb and or as part of a carrier wave. Such a propagated signal may take any of a variety of forms, including, but not limited to, electromagnetic, optical, or any suitable combination thereof A computer readable signal medium may comprise any computer readable medium that is not a computer readable storage medium and that can communicate, propagate, and/or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
   one or more wireless access points operable to communicate with a communication network;
   one or more electronic tracking devices each comprising an electronic-ink display, the one or more electronic tracking devices operable to communicate wirelessly with the one or more wireless access points;
   a plurality of manufacturing system operator computer systems operable to communicate with the communication network, each of the manufacturing system operator computer systems associated with at least one manufacturing work area; and
   a server operable to communicate with the communication network, the server comprising a processing system and a memory system in communication with the processing system, the memory system comprising a manufacturing system database and a plurality of instructions that when executed by the processing system result in:
      updating at least one entry in the manufacturing system database based on receiving an operation notification from one of the manufacturing system operator computer systems;
      determining a current manufacturing process step associated with the operation notification;
      identifying an electronic tracking device of the one or more electronic tracking devices associated with the operation notification; and
      transmitting a display update for the electronic-ink display of the identified electronic tracking device through at least one of the one or more wireless access points based on determining that the operation notification comprises a transition from the current manufacturing process step to a next manufacturing process step.

2. The system of claim 1, further comprising instructions that when executed by the processing system result in:
   recording a start time based on determining that the current manufacturing process step has begun responsive to a first data entry event associated with the identified electronic tracking device by one of the manufacturing system operator computer systems;
   recording a stop time based on determining that the current manufacturing process step has been completed responsive to a second data entry event associated with the identified electronic tracking device by one of the manufacturing system operator computer systems;
   determining a duration of the current manufacturing process step based on a difference between the stop time and the start time as adjusted in view of any detected pause events; and
   logging the duration in the manufacturing system database in combination with an operator identifier and an operation identifier of the current manufacturing process step.

3. The system of claim 1, further comprising instructions that when executed by the processing system result in:
   receiving a process split request;
   identifying the next manufacturing process step;
   sending data associated with the next manufacturing process step to a second electronic tracking device;
   recording a process split event in the manufacturing system database identifying a first group of parts to complete the current manufacturing process step associated with the identified electronic tracking device and a second group of parts to perform the next manufacturing process step associated with the second electronic tracking device; and
   tracking a completion status of the first group of parts in parallel with a completion status of the second group of parts.

4. The system of claim 1, further comprising instructions that when executed by the processing system result in:
   tracking a manufacturing process step status of a plurality of parts distributed between a plurality of manufacturing work areas using a plurality of the electronic tracking devices; and
   enforcing a predetermined manufacturing process step sequence defined in the manufacturing system database to constrain successful data entry associated with the electronic tracking devices by the manufacturing system operator computer systems as the parts transition between the manufacturing work areas.

5. The system of claim 1, further comprising an administrative computer system operable to communicate with the communication network and to execute instructions that result in:
   interfacing with the server to define a plurality of order data in the manufacturing system database to produce one or more parts, the order data comprising an order number, a part number, a quantity of parts, and a priority or due date; and
   commanding a write of at least a portion of the order data to the identified electronic tracking device.

6. The system of claim 5, wherein the administrative computer system is further operable to execute instructions that result in:
   defining, in the manufacturing system database, a plurality of manufacturing system configuration parameters associated with a plurality of manufacturing work areas;
   defining, in the manufacturing system database, a list of manufacturing equipment available in the manufacturing work areas;
   defining, in the manufacturing system database, a list of operators to perform at least one manufacturing process step;
   defining, in the manufacturing system database, a predetermined manufacturing process step sequence of manufacturing process steps to manufacture the one or more parts; and
   defining, in the manufacturing system database, a list of the one or more electronic tracking devices available for assignment.

7. The system of claim 1, wherein the identified electronic tracking device comprises a light emitting diode, and further comprising instructions that when executed by the processing system result in:
   transmitting a status indicator to the identified electronic tracking device configured to illuminate the light emitting diode according to a status indicator illumination pattern.

8. The system of claim 1, wherein the identified electronic tracking device comprises a device identifier, and the display update comprises one or more of: a process step identifier, an operator identifier, an order number identifier, a part number identifier, a last manufacturing process step completed indicator, and at least one instruction for performing the current manufacturing process step.

9. The system of claim 1, further comprising a wireless router operable to communicate with the communication network and at least one of the manufacturing system operator computer systems, wherein the one or more wireless access points communicate wirelessly with the one or more electronic tracking devices using a different communication protocol than the wireless router uses to communicate with the at least one of the manufacturing system operator computer systems.

10. The system of claim 1, further comprising instructions that when executed by the processing system result in:
    outputting an interactive user interface comprising one or more data input fields, an operational status of the one or more wireless access points, a pending operation status, and a graphical depiction of content to be displayed on the electronic-ink display of the identified electronic tracking device.

11. The system of claim 10, wherein the interactive user interface further comprises one or more of: an indicator of the next manufacturing process step and a timer status associated with the current manufacturing process step.

12. The system of claim 1, further comprising instructions that when executed by the processing system result in:
    outputting an active job report indicative of the one or more electronic tracking devices that are actively in use prior to completing a final manufacturing process step.

13. A method comprising:
    updating, by a server, at least one entry in a manufacturing system database based on receiving an operation notification from one of a plurality of manufacturing system operator computer systems;
    determining, by the server, a current manufacturing process step associated with the operation notification;
    identifying, by the server, an electronic tracking device associated with the operation notification; and transmitting a display update for an electronic-ink display of the identified electronic tracking device through at least one wireless access point based on determining that the operation notification comprises a transition from the current manufacturing process step to a next manufacturing process step.

14. The method of claim 13, further comprising:
recording, by the server, a start time based on determining that the current manufacturing process step has begun responsive to a first data entry event associated with the identified electronic tracking device by one of the manufacturing system operator computer systems;
recording, by the server, a stop time based on determining that the current manufacturing process step has been completed responsive to a second data entry event associated with the identified electronic tracking device by one of the manufacturing system operator computer systems;
determining, by the server, a duration of the current manufacturing process step based on a difference between the stop time and the start time as adjusted in view of any detected pause events; and
logging, by the server, the duration in the manufacturing system database in combination with an operator identifier and an operation identifier of the current manufacturing process step.

15. The method of claim 13, further comprising:
receiving a process split request;
identifying the next manufacturing process step;
sending data associated with the next manufacturing process step to a second electronic tracking device;
recording a process split event in the manufacturing system database identifying a first group of parts to complete the current manufacturing process step associated with the identified electronic tracking device and a second group of parts to perform the next manufacturing process step associated with the second electronic tracking device; and
tracking a completion status of the first group of parts in parallel with a completion status of the second group of parts.

16. The method of claim 13, further comprising:
tracking a manufacturing process step status of a plurality of parts distributed between a plurality of manufacturing work areas using a plurality of the electronic tracking devices; and
enforcing a predetermined manufacturing process step sequence defined in the manufacturing system database to constrain successful data entry associated with the electronic tracking devices by the manufacturing system operator computer systems as the parts transition between the manufacturing work areas.

17. A computer program product comprising a non-transitory storage medium embodied with computer program instructions that when executed by a processing system of a server cause the server to implement:
updating at least one entry in a manufacturing system database based on receiving an operation notification from one of a plurality of manufacturing system operator computer systems;
determining a current manufacturing process step associated with the operation notification;
identifying an electronic tracking device associated with the operation notification; and
transmitting a display update for an electronic-ink display of the identified electronic tracking device through at least one wireless access point based on determining that the operation notification comprises a transition from the current manufacturing process step to a next manufacturing process step.

18. The computer program product of claim 17, further comprising computer program instructions that when executed by the processing system cause the server to implement:
recording a start time based on determining that the current manufacturing process step has begun responsive to a first data entry event associated with the identified electronic tracking device by one of the manufacturing system operator computer systems;
recording a stop time based on determining that the current manufacturing process step has been completed responsive to a second data entry event associated with the identified electronic tracking device by one of the manufacturing system operator computer systems;
determining a duration of the current manufacturing process step based on a difference between the stop time and the start time as adjusted in view of any detected pause events; and
logging the duration in the manufacturing system database in combination with an operator identifier and an operation identifier of the current manufacturing process step.

19. The computer program product of claim 17, further comprising computer program instructions that when executed by the processing system cause the server to implement:
receiving a process split request;
identifying the next manufacturing process step;
sending data associated with the next manufacturing process step to a second electronic tracking device;
recording a process split event in the manufacturing system database identifying a first group of parts to complete the current manufacturing process step associated with the identified electronic tracking device and a second group of parts to perform the next manufacturing process step associated with the second electronic tracking device; and
tracking a completion status of the first group of parts in parallel with a completion status of the second group of parts.

20. The computer program product of claim 17, further comprising computer program instructions that when executed by the processing system cause the server to implement:
tracking a manufacturing process step status of a plurality of parts distributed between a plurality of manufacturing work areas using a plurality of the electronic tracking devices; and
enforcing a predetermined manufacturing process step sequence defined in the manufacturing system database to constrain successful data entry associated with the electronic tracking devices by the manufacturing system operator computer systems as the parts transition between the manufacturing work areas.

* * * * *